Figure 1:
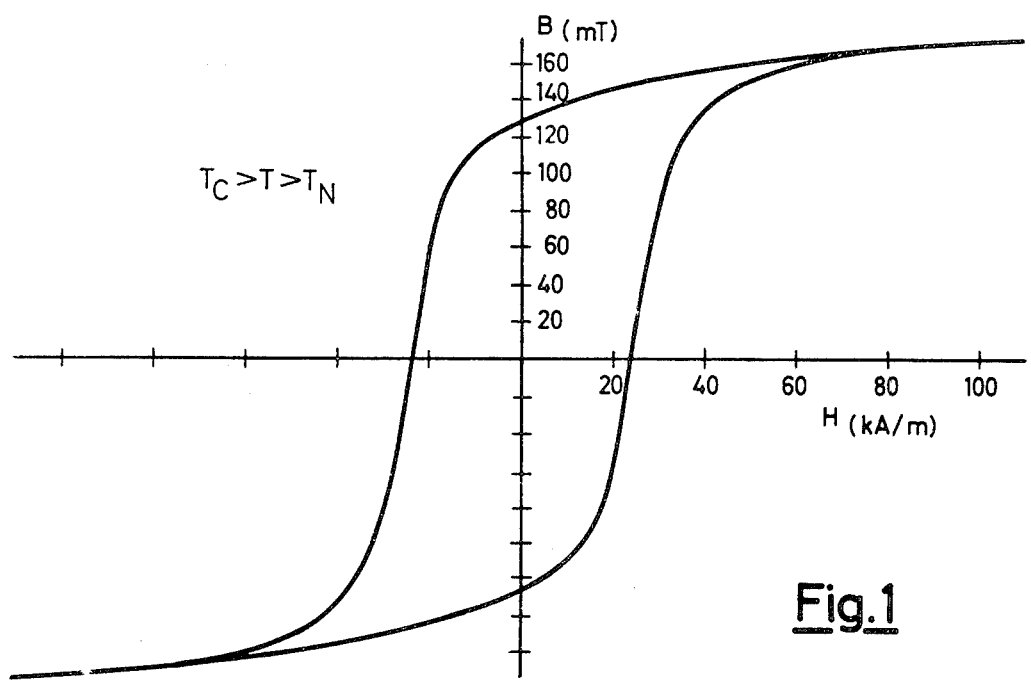

United States Patent [19]

Koester et al.

[11] 3,959,032

[45] May 25, 1976

[54] MAGNETIC MATERIALS WITH EXCHANGE ANISOTROPY AND PROCESS FOR THEIR MANUFACTURE

[75] Inventors: Eberhard Koester, Frankenthal; Gerd Wunsch, Speyer; Paul Deigner, Weisenheim; Dieter Graw, Ludwigshafen; Karl Uhl, Frankenthal; Werner Steck, Mutterstadt, all of Germany

[73] Assignee: BASF Aktiengesellschaft, Ludwigshafen (Rhine), Germany

[22] Filed: Dec. 23, 1974

[21] Appl. No.: 535,577

[30] Foreign Application Priority Data
Dec. 29, 1973 Germany............................ 2365179

[52] U.S. Cl. ................................ 148/105; 75/.5 BA; 148/6.3; 148/31.55; 252/62.55
[51] Int. Cl.² ........................................... H01F 1/33
[58] Field of Search ......... 148/6.3, 104, 105, 31.55, 148/31.5; 427/128, 132; 252/62.51, 62.55; 75/170, .5 BA; 29/192 CP

[56] References Cited
UNITED STATES PATENTS

| | | | |
|---|---|---|---|
| 1,695,041 | 12/1928 | Elmen............................... | 148/31.55 |
| 1,954,102 | 4/1934 | Roseby ............................. | 148/104 |
| 3,460,968 | 8/1969 | Bate et al............................ | 148/6.3 |
| 3,726,664 | 4/1973 | Parker et al. ...................... | 148/105 |

Primary Examiner—Ralph S. Kendall
Attorney, Agent, or Firm—Johnston, Keil, Thompson & Shurtleff

[57] ABSTRACT

Magnetic materials which essentially consist of a phase A with a ferromagnetic spin system and a phase B with an anti-ferromagnetic spin system, phases A and B interacting by exchange coupling, and the manufacture of such materials. The materials consist essentially of two-phase magnetic single-domain particles, with the alloy $[Co_xNi_{1-x}]$ as the ferromagnetic phase A and its oxidized form $[(CoO)_x(NiO)_{1-x}]$ as the anti-ferromagnetic phase B, with values of $x$ of 0.04 to 0.96. They are manufactured by surface oxidation of a pigment layer, which at least covers the surface but may extend deeper, having the composition of phase A, to form an oxide layer, at least 40 Å thick, of the phase B, followed by heating in an inert gas atmosphere, or by reduction of a corresponding layer of phase B to a layer of phase A. Magnetic single-domain particles of this composition have a Néel temperature which varies with X. As a result, materials are obtained which have an asymmetrical hysteresis loop, attributable to exchange anisotropy, at temperatures which can be varied within wide limits in accordance with the intended use of the material.

3 Claims, 2 Drawing Figures

MAGNETIC MATERIALS WITH EXCHANGE ANISOTROPY AND PROCESS FOR THEIR MANUFACTURE

This application discloses and claims subject matter described in German Patent Application No. P 23 65 179.8, filed Dec. 29, 1973, which is incorporated herein by reference.

The invention relates to magnetic materials which consist of a phase A with a ferromagnetic spin system, especially a mixed crystal of metallic cobalt and metallic nickel, and a phase B with an antiferromagnetic spin system, especially the oxidized form of the metal composition of phase A, each phase in the crystal lattice being joined to the other in such a way that the two spin systems are coupled with one another below a temperature which is specific for the material, namely the Néel temperature, and show a different remanence after saturation in the two polarization directions. These materials are further characterized by a particle size which exhibits the behavior of a magnetic single domain. The invention further relates to the processes particularly designed for the manufacture of the particles according to the invention.

In the general treatment of magnetic phenomena, materials are described as paramagnetic if the atoms of which they consist have a permanent magnetic moment and there is very little or no interaction between them. Conversely, if the interactions are pronounced, the exchange forces cause the moments of adjacent atoms to become oriented parallel to one another. If the moments are oriented in the same direction, that is to say if there is a positive interaction, the result is that the material is ferromagnetic, if there is a negative interaction in equal amount, the material is antiferromagnetic and if there is a negative interaction in unequal amount it is ferrimagnetic.

The externally active magnetic moment in ferromagnetic or ferrimagnetic materials can be influenced by external magnetic fields. If the field is reversed continuously, the magnetization is also reversed, in part discontinuously, into the opposite direction. The change in sign occurs, with many materials, not as the field passes through zero but in the ultimate opposite field, the coercive force. In the case of permanent magnets, so-called hysteresis results in the course of a complete cycle of the external magnetic field.

If two phases, a ferromagnetic phase and an antiferromagnetic crystal region, adjoin so that a magnetic interaction can extend beyond a crystal plane, an exchange interaction results, which is described as exchange anisotropy (W. H. Meiklejohn, J. Applied Physics, Vol. 33, Suppl. to No. 3 (1962), p. 1328 et seq.).

In order to obtain the desired effect of a preferred direction of the coupling of the two systems it is necessary that the Curie temperature $T_C$ of the ferromagnetic material, that is to say the temperature at which the thermal movement destroys the magnetic order, be greater than the Néel temperature $T_N$ of the antiferromagnetic material. Under these conditions the magnetization of the ferromagnetic phase becomes oriented, above $T_N$, in accordance with an externally applied large magnetic field. If a temperature below $T_N$ is chosen next, the plane of the magnetic moments of the antiferromagnetic material which is nearest to the ferromagnetic material becomes ordered in the same direction, whilst the further ordering takes place antiferromagnetically. Where the antiferromagnetic order is very tied to the crystal lattice, i.e. where there is high crystal anisotropy, the magnetization of the ferromagnetic material is held, as a result of the coupling, in the same direction as that which acted on the material whilst it was being cooled to below the Néel temperature. Such a material possesses vector anisotropy and in an alternating field a hysteresis curve shifted parallel to the field direction results.

In addition to this effect, a characteristic of exchange anisotropy which is found in materials with high crystal anisotropy is a torque curve in the shape of a sine $\theta$ function, whilst the rotational hysteresis losses in high fields are in most cases no longer zero.

An important precondition of a measurable effect based on exchange interaction is that the ferromagnetic material must consist of a magnetic single domain. Only in a magnetic single domain is the spontaneous magnetization uniform as a result of the interaction of the atomic magnetic moments, and is the coupling to the antiferromagnet therefore completely effective over the (entire) interface.

Known materials which exhibit such properties include, above all, the systems cobalt/cobalt oxide and nickel/nickel oxide (U.S. Pat. No. 3,110,613). The literature also describes the exchange anisotropy phenomenon for iron/iron(II) oxide, $\alpha$-iron-(III) oxide, lanthanum ferrite, some alloys of manganese, some alloys of iron and others (W. H. Meiklejohn, J. Appl. Physics, Vol. 33, Suppl. to No. 3 (1962), p. 1,328 et seq.). It is also known that these materials do not in every case show all the characteristics of exchange anisotropy, so that various materials have been investigated, depending on the intended use. Thus it is known that in the case of magnetic systems which contain nickel oxide, the rotational hysteresis losses do not disappear in high fields, because of the low crystal anisotropy of the material, but on the other hand a shift in the hysteresis loop is not observed (H. Schmid, Kobalt No. 6 (1960), p. 8 – 14).

U.S. Pat. Nos. 2,988,466 and 3,110,613 describe the relatively high rotational hysteresis losses of such magnetic materials, which do not vanish even if high magnetic fields are applied, as being particularly suitable for hysteresis motors. A metal from the group of iron, cobalt and nickel is mentioned as the ferromagnetic phase and an oxide of the metal as the predominantly antiferromagnetic phase.

Barium-potassium ferrites are also know (U.S. Pat. No. 3,284,359) which in addition to the peculiarities of rotational hysteresis also exhibit an asymmetrical hysteresis loop. A shifted hysteresis loop was also found in systems which contain $\gamma$-iron(III) and $\alpha$-iron(III) oxide or chromium trioxide ($Cr_2O_3$).

It has also already been proposed to use magnetic materials exhibiting exchange anisotropy and in particular possessing an asymmetrical hysteresis loop as magnetizable materials for magnetic recording media since they permit the manufacture of media whereof the information content can subsequently no longer be changed without being noticed.

A disadvantage of the conventional materials possessing exchange anisotropy is that it is not possible to vary their specific properties through modifications of the system. Thus, for example, the Neel temperature above which the magnetization of the ferromagnetic constituent can be modified and below which the exchange anisotropy comes into play lies outside the temperature range which numerous applications demand.

In addition, the inadequate ferromagnetic magnetization prevents the use of many systems in which there should be a correlation between the permanent magnet properties, such as, for example, high remanence, and the chosen Néel temperature.

It is an object of the invention to provide magnetic pigments which is a result of exchange anisotropy exhibit an asymmetrical hysteresis loop, which have magnetic properties determined by their behavior as single-domain particles, and which have a Neel temperature which can be varied within wide limits through varying the composition of the systems which exhibit exchange interaction. It is a further object of the invention to provide a method of manufacturing these materials.

We have found that magnetic pigments which consist essentially of two-phase magnetic single-domain particles with the alloy $[Co_xNi_{1-x}]$ as the ferromagnetic phase A and its oxidized form $[(CoO)_x(NiO)_{1-x}]$ as the phase B, $x$ assuming values from 0.04 to 0.96, which have a ratio of remanence to saturation which is greater than 0.2 and a coercive force greater than 16 kA/m, measured in an applied field of 800 kA/m, possess a different value of the remanence after saturation, in the two magnetic polarization directions, below a temperature which is different for, and characteristic of, each value of $x$.

The materials according to the invention consist of a cobalt-nickel alloy as the ferromagnetic material (phase A), the proportion of cobalt being from 4 to 96 atom per cent, preferably from 40 to 90 atom per cent. The magnetic pigments consisting of this material are obtained, as a result of the process of manufacture, in such particle sizes that they are magnetic single domains, the ferromagnetic part preferably being greater than 100 A and less than 1000 A. In the process of manufacture according to the invention, a surface layer of the ferromagnetic phase is oxidized so as to grow an oxide layer of which the crystallograhic order in at least one interfacial layer is appropriate for coupling of the spin systems. This antiferromagnetic interfacial layer of the phase B should be not less than 40 A thick. There is no upper limit imposed to ensure its proper functioning. Since the antiferromagnetic phase does not contribute to the effective magentic moment, the oxide layer should however not be substantially more than 1,000 A thick.

In another embodiment, the materials according to the invention consist of a core of phase B, namely the oxide material, and an outer shell of the ferromagnetic metal phase A.

A further advantageous structure of the materials according to the invention comprises a system of several layers of the two phases A and B. In such materials, the two phases alternate and here again the core can consist of phase A or phase B. This structure makes it possible to increase the effective area over which the coupling of the ferromagnetic and antiferromagnetic system occurs.

In a preferred embodiment, only a part of the magnetic material according to the invention exhibits the exchange interaction, in particular as asymmetrical hysteresis loop.

The materials according to the invention can contain additional elements in each phase. Possible modifiers are any metals present in such amounts that they do not interfere with the exchange interaction between the metallic phase A and the oxide phase B. In particular, iron, manganese, zinc, chromium, aluminum and other metals can be added. The amounts in which such additives do not interfere with the manufacture of the materials according to the invention is easily determined experimentally and depends on the incorporation of the particular material into the particular crystal lattice.

Figure 2:
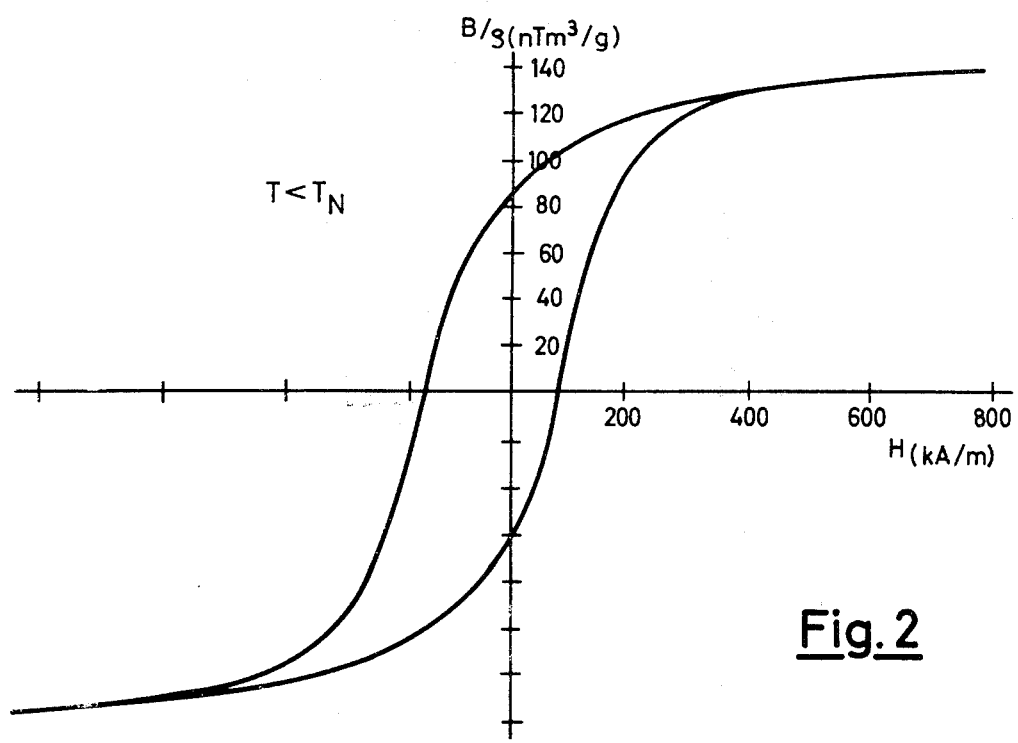

The state of the art did not lead to the expectation that the materials according to the invention would show an asymmetrical hysteresis loop. FIG. 1 shows such a material above the Neel temperature $T_N$ but below the Curie temperature $T_C$. When the material is cooled to below $T_N$ in an external magnetic field, a hysteresis curve as shown in FIG. 2 results. By way of example, materials according to the invention give shifts in the hysteresis curves, along the field axis, of from 10 oerstedsat room temperature to 200 oerstedsat −140°C.

It is a further advantage of the materials according to the invention that they provide magnetic pigments with an asymmetrical hysteresis loop which, however, can be utilized optimally for any particular application because the Néel temperature can be varied and selected by simple choice of the cobalt-nickel composition of the starting material. Thus, the Néel temperature of the materials according to the invention can be from 28° to 236°C, depending on the ratio of cobalt to nickel.

One of the fields of use in which the materials which we claim provide great advantages is their use as a magnetizable material, or at least as a constituent thereof, for the manufacture of magnetic recording media. They give media in which recordings can no longer be changed unnoticed if the recording is made at a temperature between the Néel temperature and the Curie temperature and the material is then cooled, or the recording medium is briefly heated to the above temperature after the signal has been recorded, and is then cooled again.

The starting materials for the processes of manufacture according to the invention are metal pigments. For the purposes of our invention, this term is to be understood to include all materials which consist predominantly of a metallic phase which must be present in at least one completely continuous surface layer. Preferably, the thickness of the metallic constituent is not less than 100 A and not more than 1000 A.

The manufacture of magnetic metal pigments of appropriate particle size is known, as is the production of an oxide skin on the surface of the particles, to prevent pyrophoric phenomena (German Printed Application No. 1,171,160).

When manufacturing the materials according to the invention, suitable metal pigments, consisting essentially of the ferromagnetic phase A $[Co_xNi_{1-x}]$ with values of $x$ from 0.04 to 0.96, are provided, on the surface only, with an oxide layer, through the use of an oxidizing agent, in such a way that this oxide layer, the composition of which is $[(CoO)_x(NiO)_{1-x}]$ (phase B), $x$ having the above values, forms a common interfacial layer which permits interaction of the two spin systems. The oxidation is preferably carried out with a gaseous oxidant, in particular air, at temperatures of up to 400°C, preferably of up to 200°C. We have found it advantageous to use a low concentration of oxidant so as to produce the oxide layer under gentle conditions. A mixture of air and inert gas, for example nitrogen, in the ratio of from 1:5 to 1:50, preferably 1:10, may be used.

Other oxidants which can be used are materials which exert an oxidative action on this finely divided metallic material consisting of cobalt and nickel. These include not only the known organic oxidants, for example alcohols, but also any inorganic oxidants.

An appropriate oxide layer can also be formed conveniently in a liquid medium. For this purpose, the pigments are dispersed in water or organic solvents, the oxidant being in solution in the liquid phase. Examples are dilute aqueous hydrogen peroxide solution and ethanol in which is dissolved a gaseous oxidant such as air.

In order to achieve to the full the desired effect of the shift of the hysteresis loops caused by the exchange anisotropy it has proved very desirable to heat the pigments, which consist essentially of the two phases A and B, at temperatures of from 100° to 450°C in an inert gas atmosphere. In general, heating for from 1 to 20 hours suffices, a duration of from 1 to 6 hours being preferred. The preferred temperature depends on the particle size but can easily be determined since it should be below the temperature — which can be established by electron microphotographs — at which the particles sinter. This thermal after-treatment results in advantageous magnetic properties of the magnetic pigments of the invention and in uniformity of the exchange anisotropy effect over the entire spectrum of particles, which is a particular advantage when mixtures with other magnetizable pigments are used.

Suitable metal pigments are manufactured from mixed oxides of the elements cobalt and nickel, having the desired metal ratio corresponding to the chosen value of $x$. Such mixed oxides can in particular be obtained by decomposition of such metal compounds as the nitrates, carbonates, formates and oxalates. Dehydration of the hydroxides is a particularly advantageous method of obtaining the appropriate mixed oxides and is carried out under an inert gas, for example nitrogen, at temperatures of up to 650°C, preferably up to 450°C. Magnetic pigments according to the invention, having a particularly suitable structure, are obtained by treating the precipitated mixed hydroxides of the appropriate composition in the precipitation liquid at temperatures of from 100° to 250°C, under autogenous pressure.

These mixed oxides are converted into the corresponding metal pigments by means of reducing agents, preferably by means of reducing gases or gas mixtures, in particular by means of hydrogen gas under normal pressure and at temperatures of up to 500°C, preferably of from 200° to 450°C.

Another suitable method of manufacture of appropriate metal pigments entails the decomposition of the mixed metal carbonyls corresponding to the metal composition of the phase A or entails other conventional reductive, thermal or electrolytic methods.

The materials and processes according to the invention permit the manufacture of various embodiments of magnetic pigments having a shifted hysteresis loop.

In one of the embodiments, the materials according to the invention consist of a core of the metallic ferromagnetic phase A whilst only a thin surface layer is an antiferromagnetically ordered oxide layer of phase B.

It has also proved advantageous to employ a metal pigment which only consists essentially of a metal phase A in the form of a continuous surface layer. If such a material is oxidized in accordance with the invention, the end product consists of a core, preferably having the composition of phase B, an inner shell of phase A and an outer layer of phase B.

The examples which follow illustrate an advantageous selection of materials according to the invention and serve to describe the process of manufacture according to the invention. Parameters measured in addition to those already explained in the above description are the specific induction of the material, $B_S/\sigma [nTm^3/g]$ and the specific remanence $B_R/\sigma [nTm^3/g] \cdot j_{er}$ is shown as a measure of the proportion of magnetic pigment exhibiting exchange anisotropy in the total composition of the material. $j_{er}$ is determined by saturating the sample in a field of 160 kA/m, heating it in the remanent state to above the particular Néel temperature $T_N$ and again cooling it. The specimen is then placed in an alternating field of 200 kA/m which slowly decreases to zero. $j_{er}$ is now obtained by measuring the residual remanence and expressing it as a percentage of the remanence of the untreated material after saturation at 160 kA/m.

EXAMPLE 1

200 g of NaOH were dissolved in 2,750 ml of water in a 6 l four-neck flask, the solution was warmed to 80°C and 356 g of $CoCl_2 \cdot 6 H_2O$ and 118 g of $NiCl_2 \cdot 6 H_2O$ dissolved in 1,250 ml of water were added dropwise in the course of 40 minutes whilst stirring (at about 300 rpm) and passing nitrogen (120 l of $N_2/hr.$) through the flask. After completion of the addition, the mixture was stirred for a further 2.5 hours at 80°C. The hydroxide percipitate $Co_xNi_{(1-x)}(OH)_2$, wherein $x = 0.75$, was filtered off, washed with distilled water and dried in a vacuum drying oven at 60°C.

80 g of the dried product were reduced for 14 hours in a rotary furnace at 300°C by means of 100 l of $H_2/hr.$ The oxygen content of the resulting product was 1.7% by weight. The product was oxidized by treating it with a 1:12 mixture of air and nitrogen at room temperature for 7 hours and was then heated under nitrogen at 300°C for 4 hours. The oxygen content was then 5.4%.

A saturation induction $B_S/\sigma$ of 83.5 $nTm^3/g$, a remanence $B_R/\sigma$ of 38.0 $nTm^3/g$ and a coercive force Hc of 53 kA/m were found, in a magnetic field of 160 kA/m. The Néel temperature $T_N$ was about 75°C. $j_{er}$ was about 1.3%.

EXAMPLE 2

The method followed was as in Example 1 but only 238 g of $CoCl_2 \cdot 6 H_2O$, and 238 g of $NiCl_2 \cdot 6 H_2O$, were dissolved in 1,250 ml of water. The solution was added dropwise in the course of 1 hour and the mixture was then stirred for a further 3 hours at 80°C.

The hydroxide precipitate $Co_xNi_{(1-x)}(OH)_2$ in which $x = 0.5$, contained in a part of the mother liquor, was introduced into a 3 l tumbler autoclave and kept at 200°C under autogenous pressure for 24 hours. The precipitate was then filtered off, washed with distilled water and dried in vacuo at 50°C.

70 g of the dried product were dehydrated for 2 hours in a rotary furnace at 250°C by means of 100 l of $N_2/hr$ and were then partially reduced for 2 hours at 300°C by means of 100 l of $H_2/hr.$ The product was then oxidized for 40 minutes in a rotary furnace at 200°C by means of a 1:10 mixture of air and nitrogen. After heating for 4 hours under nitrogen, the sample was cooled to room temperature and post-oxidized at this temperature for 2 hours by means of a 1:10 mixture of air and nitrogen. Air was then passed over the materials for 10 minutes. The oxygen content was 8.4%.
The following values were measured at 160 kA/m:

$B_S/\sigma$ = 63 nTm³/g
$B_R/\sigma$ = 27.4 nTm³/g
Hc = 31.5 kA/m
$j_{rr}$ = 14%
$T_x$ = 120°C.

EXAMPLE 3

The experiment was carried out as in Example 1, but with 380 g of $CoCl_2 \cdot 6 H_2O$ and 95 g of $NiCl_2 \cdot 6 H_2O$ dissolved in 1,250 ml of water.

The hydroxide precipitate $Co_xNi_{(1-x)}(OH)_2$ ($x = 0.8$) was filtered off, washed with distilled water and dried in vacuo at 60°C. The product was then dehydrated for 4 hours in a rotary furnace at 230°C in presence of air. The X-ray spectrum of the product then showed that it had substantially been converted to an oxide of the spinel type. The material was then reduced for 6 hours at 350°C by means of 90 l of $H_2$/hr, after which the product was oxidized for 75 minutes at 200°C with a 1:13 mixture of air and nitrogen. The oxygen content was then about 11.5%. After heating for 4 hours at 350°C under nitrogen, the following values were measured at a field strength of 160 kA/m:

$B_S/\sigma$ = 50.4 nTm³/g
$B_R/\sigma$ = 24.7 nTm³/g
Hc = 59 kA/m
$j_{rr}$ = 6.3%
$T_x$ = 60°C.

EXAMPLE 4

337 g of $CoSo_4 \cdot 7 H_2O$ and 224.2 g of $NiSo_4 \cdot 7 H_2O$ were dissolved in 4 l of water in a 6 l three-neck flask and the solution was warmed to 70°C.

284 g of $(NH_4)_2C_2O_4 \cdot H_2O$, dissolved in 1.5 l of water and also warmed to 70°C, were rapidly added dropwise whilst stirring, for example at 280 rpm. The mixture was then stirred for a further 30 minutes at 70°C and the cobalt-nickel oxalate which has precipitated was filtered off, washed until free from sulfate and dried in vacuo at 50°C.

70 g of the dried oxalate were reduced for 12 hours in a rotary furnace at 300°C by means of 100 l of $H_2$/hr. The oxygen content was then 2.1%. The mixture was then oxidized for 60 minutes at 200°C by means of a 1:10 mixture of air and $N_2$ and heated at 400°C under nitrogen for 4 hours. The oxygen content was now 8.9% and the values measured at 160 kA/m were:

$B_S/\sigma$ = 70.6
$B_R/\sigma$ = 30.1
Hc = 40.8 kA/m
$j_{rr}$ = 2.5%.

The sample was again treated with a 1:10 mixture of air and $N_2$ at 200°C, this time for 30 minutes. After 4 hours' heating under nitrogen at 400°C, the oxygen content was 13%.

The magnetic values at 160 kA/m were:

$B_S/\sigma$ = 46.8
$B_R/\sigma$ = 21.3
Hc = 50.7 kA/m
$j_{rr}$ = 9%
$T_x$ = ~102°C.

We claim:

1. Magnetic pigments which consist essentially of two-phase magnetic single-domain particles with the alloy $[Co_xNi_{1-x}]$ as the ferromagnetic phase A and its oxidized form $[(CoO)_x(NiO)_{1-x}]$ as the antiferromagnetic phase B, $x$ assuming values from 0.04 to 0.96, which have a ratio of remanence to saturation induction which is greater than 0.2 and a coercive force greater than 16 kA/m, measured in an applied field of 800 kA/m, and which possess a different value of the remanence after saturation, in the two magnetic polarization directions, below a temperature which is different for, and characteristic of, each value of $x$.

2. A process for the manufacture of magnetic pigments showing exchange anisotropy, essentially consisting of two-phase magnetic single domain particles with the alloy $[Co_xNi_{1-x}]$ as the ferromagnetic phase A and its oxidized form $[(CoO)_x(NiO)_{1-x}]$ as the antiferromagnetic phase B, X assuming values from 0.04 to 0.96, comprising the steps of
  1. oxidizing the surface of a metal pigment consisting essentially of the mixed phase $[Co_xNi_{1-x}]$ to a depth of from 40 to 1000 A at a temperature of up to 400°C; and
  2. heating the resulting product in an inert gas atmosphere at a temperature of from 100° to 450°C.

3. A process as set forth in claim 2 wherein the pigment oxidized in step(1) is formed by
  a. forming mixed oxides of the formula $[(CoO)_x(NiO)_{1-x}]$ by precipitating the corresponding mixed hydroxides, treating these mixed hydroxides in the reaction solution at from 100° to 250°C under autogenous pressure and dehydrating these mixed hydroxides at from 230° to 650°C in an inert gas atmosphere; and
  b. reducing said mixed oxides to the metal pigment, consisting essentially of the mixed phase $[Co_xNi_{1-x}]$, at temperature up to 500°C.

* * * * *